United States Patent
Kiel et al.

(10) Patent No.: US 12,269,689 B2
(45) Date of Patent: Apr. 8, 2025

(54) CONVEYOR BELT SCRAPER SYSTEM WITH SIMPLE MAINTENANCE

(71) Applicant: Cornelia Kill-Frech, Havixbeck (DE)

(72) Inventors: Martin Kiel, Recklinghausen (DE); Claus Weimann, Wetter (DE)

(73) Assignee: Cornelia Kill-Frech, Havixbeck (DE)

( * ) Notice: Subject to any disclaimer, the term of this patent is extended or adjusted under 35 U.S.C. 154(b) by 164 days.

(21) Appl. No.: 18/020,312

(22) PCT Filed: Nov. 11, 2021

(86) PCT No.: PCT/EP2021/081411
§ 371 (c)(1),
(2) Date: Feb. 8, 2023

(87) PCT Pub. No.: WO2022/112016
PCT Pub. Date: Jun. 2, 2022

(65) Prior Publication Data
US 2023/0271788 A1  Aug. 31, 2023

(30) Foreign Application Priority Data
Nov. 27, 2020  (DE) .................... 10 2020 131 557.0
Nov. 27, 2020  (DE) .................... 10 2020 131 558.9

(51) Int. Cl.
*B65G 45/16* (2006.01)
*B65G 45/12* (2006.01)

(52) U.S. Cl.
CPC ............. *B65G 45/16* (2013.01); *B65G 45/12* (2013.01)

(58) Field of Classification Search
CPC ................................ B65G 45/12; B65G 45/16
See application file for complete search history.

(56) References Cited

U.S. PATENT DOCUMENTS

| 4,098,394 A | 7/1978 | Stahura |
| 4,249,650 A * | 2/1981 | Stahura .................. B65G 45/16 15/256.5 |

(Continued)

FOREIGN PATENT DOCUMENTS

| CN | 207390330 U | 5/2018 |
| DE | 102013006821 A1 | 7/2014 |

(Continued)

OTHER PUBLICATIONS

International Search Report and Written Opinion of International Searching Authority for International Application No. PCT/EP2021/081411, with English translation of International Search Report, mailed Feb. 9, 2022 (10 pages).

*Primary Examiner* — Gene O Crawford
*Assistant Examiner* — Lester III Rushin
(74) *Attorney, Agent, or Firm* — Ice Miller LLP

(57) ABSTRACT

A scraper system for a conveyor belt, a belt conveyor including same, and a method. The system includes a support and a scraper element for contacting the belt. A mounting includes an attachment part for attaching relative to the belt frame of the belt, a holding element for attaching the support to the attachment part, and a support element. The holding element is coupled to the support via a clamping assembly such that a torque can be applied about the support's longitudinal axis, and the holding element is releasably connected to the attachment part. The holding element is operatively connected to the attachment part on which the support is held, and during installation, the holding element is released from the attachment part. The support, scraper module, and holding element can be pulled longitudinally into a pull-out position such that the scraper module passes by the attachment part, wherein the support element supports the support.

14 Claims, 11 Drawing Sheets

(56) References Cited

U.S. PATENT DOCUMENTS

| | | |
|---|---|---|
| 4,779,716 A | 10/1988 | Gordon |
| 4,854,443 A | 8/1989 | Gordon |
| 5,727,670 A | 3/1998 | Johnson |
| 5,950,803 A | 9/1999 | Schwarze |
| 6,439,373 B1 | 8/2002 | Swinderman |
| 11,440,745 B2 * | 9/2022 | DeVries ................. B65G 45/16 |
| 2014/0283358 A1 | 9/2014 | Kuiper et al. |
| 2015/0360880 A1 | 12/2015 | Krosschell et al. |
| 2016/0001329 A1 | 1/2016 | Schwarze |
| 2019/0193946 A1 * | 6/2019 | DeVries .............. G01M 13/028 |
| 2021/0130105 A1 | 5/2021 | Schwarze |
| 2023/0056544 A1 * | 2/2023 | DeVries ................. B65G 43/02 |
| 2024/0067456 A1 * | 2/2024 | DeVries ................. B65G 43/02 |

FOREIGN PATENT DOCUMENTS

| | | |
|---|---|---|
| DE | 102017114931 A1 | 7/2018 |
| DE | 202020104666 U1 | 8/2020 |
| EP | 1 000 881 B1 | 9/2004 |
| EP | 1280718 B1 | 10/2009 |
| JP | 50-133491 | 10/1975 |
| JP | 62215416 A | 9/1987 |
| JP | 6440107 A | 2/1989 |
| JP | 2573522 B2 | 1/1997 |
| JP | 2009170844 A | 7/2009 |
| KR | 101875134 B1 | 7/2018 |
| RU | 2690783 C2 | 6/2019 |
| TW | 201532923 A | 9/2015 |
| WO | WO 95/19310 A1 | 7/1995 |
| WO | 2018/111743 A1 | 6/2018 |

* cited by examiner

Fig. 8d
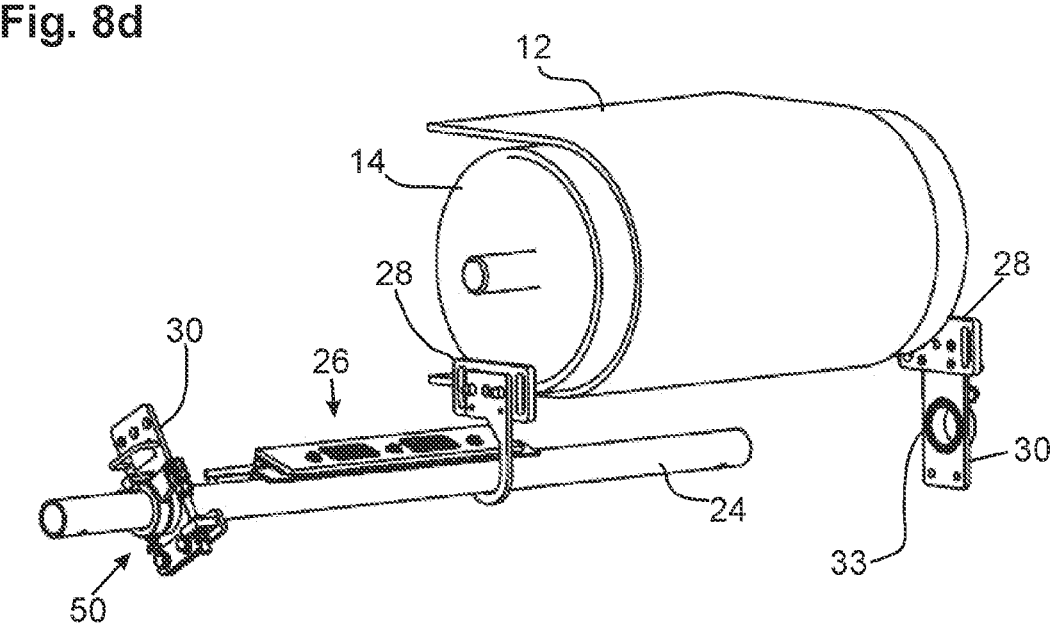
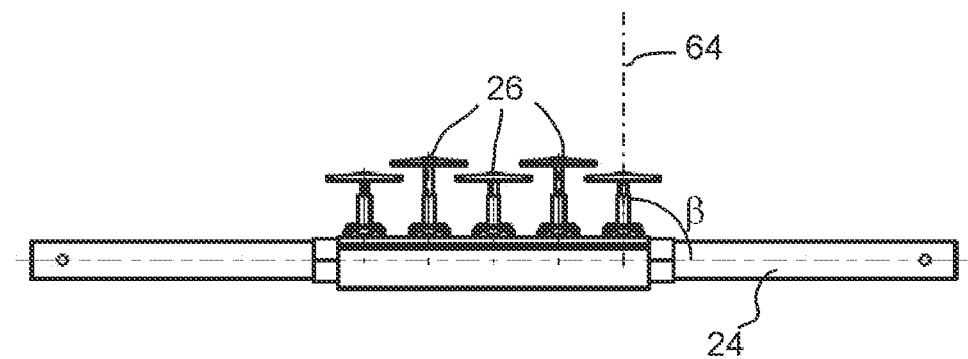
Fig. 8e

Fig. 11
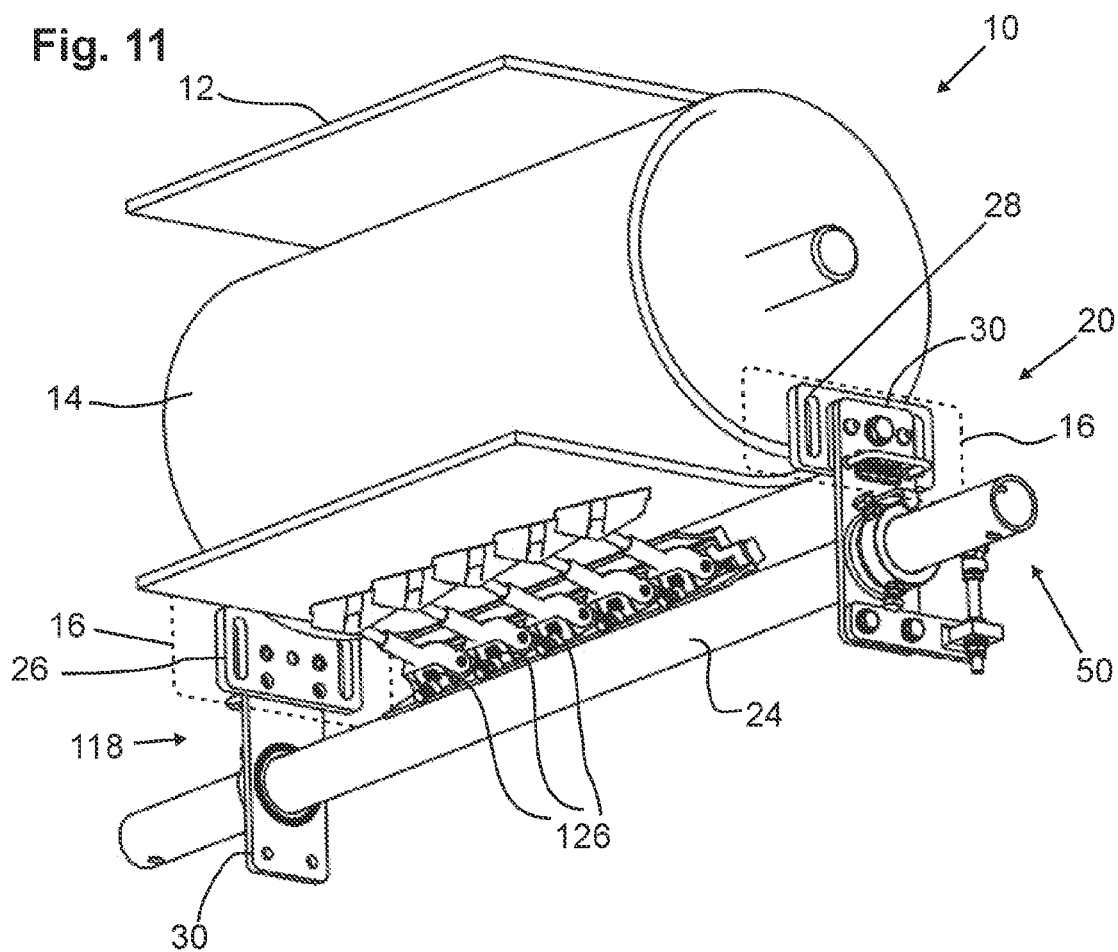
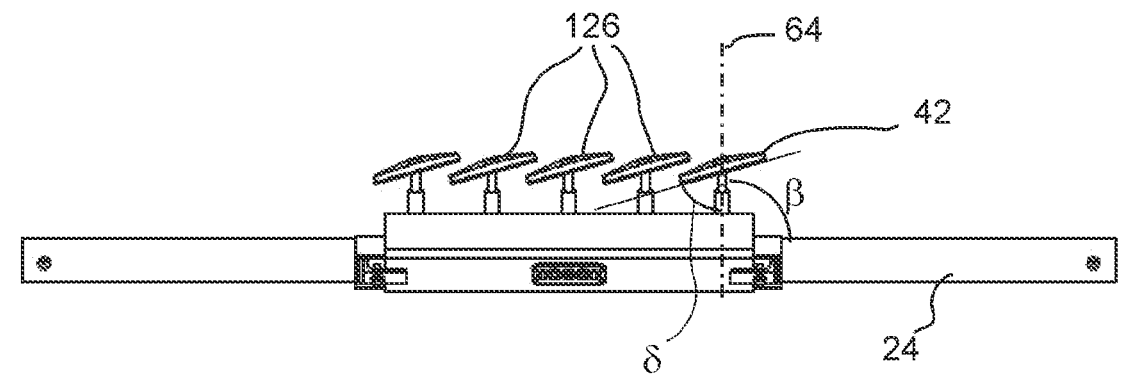
Fig. 12

Fig. 13
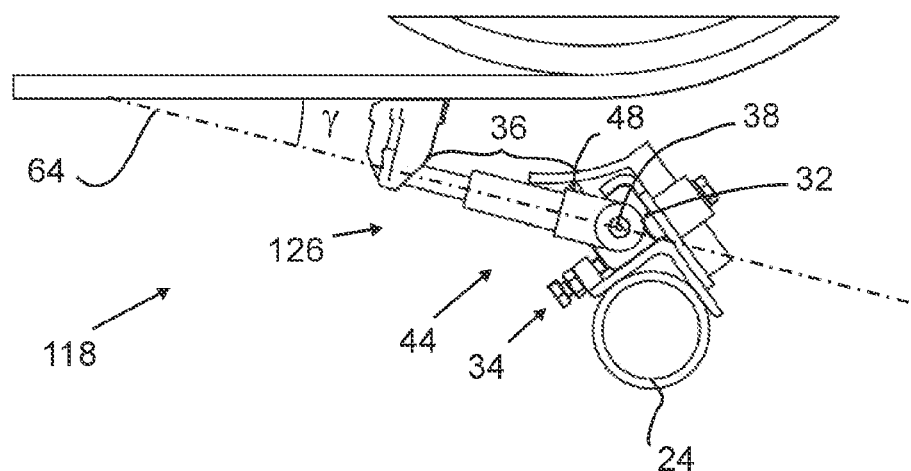
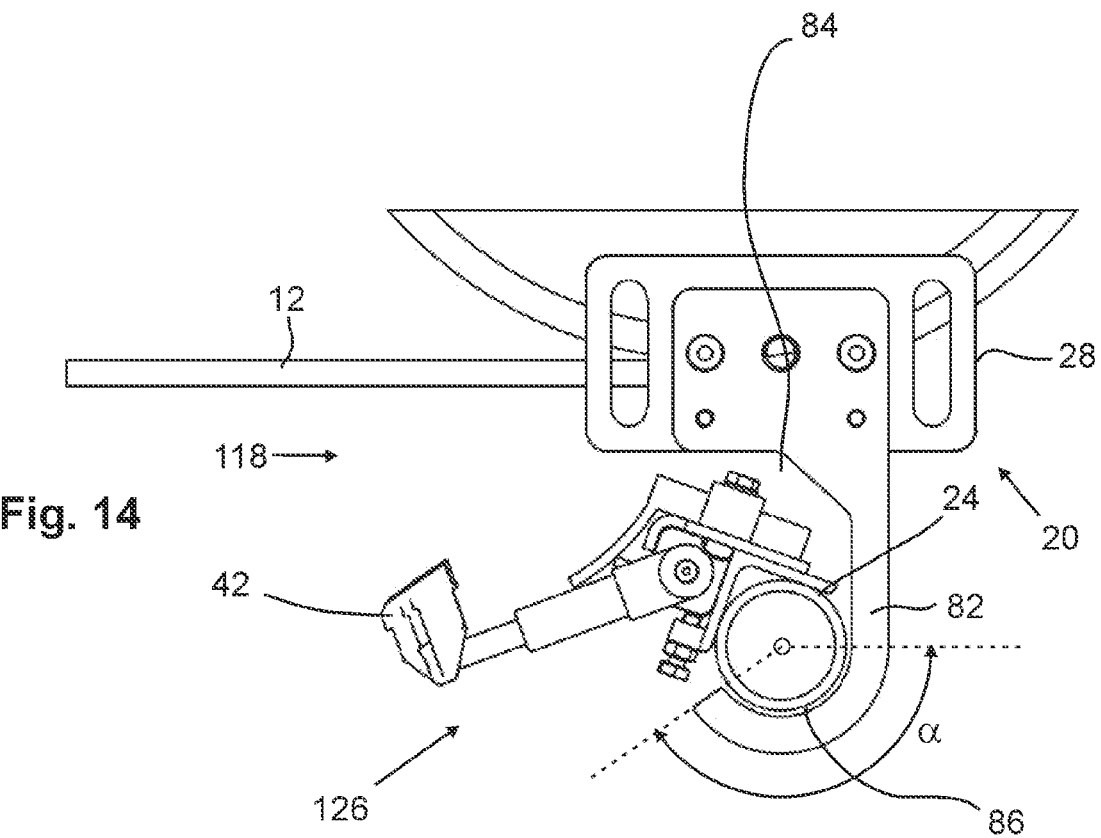
Fig. 14

– continued –

CONVEYOR BELT SCRAPER SYSTEM WITH SIMPLE MAINTENANCE

CROSS-REFERENCE TO RELATED APPLICATIONS

This application is a U.S. National Stage of International Application No. PCT/EP2021/081411, filed Nov. 11, 2021, which claims the benefit of Germany Patent Application No. 10 2020 131 557.0, filed Nov. 27, 2020, and Germany Patent Application No. 10 2020 131 558.9, filed Nov. 27, 2020, all of which are incorporated herein by reference in their entireties.

FIELD OF THE INVENTION

The invention relates to a scraper system for a conveyor belt, to a belt conveyor herewith and to a method for performing mounting, testing or maintenance work on a scraper system.

BACKGROUND OF THE INVENTION

The use of scraper systems is known for conveyor belts of belt conveyors which are deployed for conveying most diverse conveyed goods. Known scraper systems mostly have a system carrier aligned transversely to the running direction of the conveyor belt, on which system carrier a plurality of scraper modules with scraper elements are located. By placing the scraper elements against the running conveyor belt, any conveyed goods adhering thereto can be scraped off.

Various types and designs of scraper systems and scraper modules are known. For example, DE 2017 114 931 A1 shows a scraper system for arrangement in the deflection region of a tripper pulley of a fast-running belt conveyor. Scraping blocks made of elastic material are fastened next to one another in an exchangeable manner to a spring-mounted system carrier which is arranged transversely to the running direction of the belt conveyor.

DE 20104 666 U1 discloses a conveyor belt scraper, in particular a drum scraper having a number of scraping elements arranged next to one another on a cross member. Each scraping element has an elastic base body and a holding device for fastening the scraping element to the cross member. The holding device has two clamping parts which interlock in a clamping manner, one of which is fastened to a holding element which can be fixed on the cross member and the other is fastened to the base body.

DE 2013 006 821 A1 describes a belt scraper system consisting of modules for the return region of conveyors. A system carrier is arranged transversely to the running direction of the conveyor belt. Multiple scraping modules are attached next to one another on the system carrier. The scraping modules each carry a scraping lamella which lies in contact with the belt in a peeling manner.

During the operation of the scraper system, the scraper elements, for example scraping lamellae or scraping blocks, are subject to considerable wear and have to be regularly replaced.

U.S. Pat. No. 4,098,394 describes a mounting and support arrangement for conveyor belt scrapers. Multiple cleaning blades are fastened to arms on a cross-shaft. A radial ratchet and pawl arrangement for rotation of the cross-shaft is provided exterior to a housing in order to bias the blades against the conveyor belt. If the blades are to be repaired or replaced, the cross-shaft is removed by removing a coupling at one end and by removing a sleeve at the opposite end. A mounting flange is disassembled from a side wall and the cross-shaft with the scraper assembly is removed from the housing 28 through an access door.

SUMMARY OF THE INVENTION

In the case of known scraper systems, access to scraper modules required for maintenance can be difficult, in particular if dangerous regions beneath the conveyor belt have to be entered. It can therefore be regarded as an object to propose a scraper system, a belt conveyor herewith as well as a method for performing mounting, testing or maintenance work on a scraper system, which makes it possible for the maintenance personnel to access scraper modules in a simple manner, avoiding risks.

The object is achieved by the claimed scraper system for a conveyor belt, the claimed belt conveyor and the claimed method. Dependent claims refer to advantageous embodiments of the invention.

The inventors started from the consideration that it is particularly complex to carry out work on the scraper system, in particular mounting, testing or maintenance work relating to the scraping modules, if dangerous areas of the plant have to be entered and therefore safeguard measures such as, for example, the installation of scaffolding or similar as well as longer operational interruptions are required. The possibility of performing maintenance work on scraper modules from outside the belt region would therefore be of particular interest. In order to achieve this, the inventers propose a scraper system, in which the system carrier having the scraper modules (or at least having one scraper module) can be pulled off laterally in the simplest possible manner.

The scraper system according to the invention includes a system carrier and at least one scraper module attached thereto, preferably multiple scraper modules attached to the system carrier, in each case having a scraper element for abutting against the conveyor belt. The system carrier is provided for arrangement transversely to the conveyor belt. It is preferably configured as a shaft that can be rotated about a longitudinal axis or can be tensioned in the rotational direction. In principle, the system carrier can have any cross-sectional shape, but is preferably of a round cross-section at least in certain sections, particularly preferably at least in the region of the two opposite end regions. In a preferred, particularly simply designed embodiment, the system carrier is configured as a continuous tube, preferably having an unchanged round cross-section throughout.

The scraper module or the scraper modules is/are preferably detachably attached to the system carrier, particularly preferably detachably fastened to the system carrier in a clamping holding device. The respective scraper element can be, e.g., a scraping block made of a flexible material, in particular if the scraper is arranged as a pre-scraper, i.e., in the region of a deflection of the conveyor belt. The scraper element preferably has a scraping edge, particularly preferably made of metal, e.g., hard metal (tungsten carbide). This can more preferably lie in contact with the conveyor belt in a peeling manner, in particular in the return region.

A holding device for attachment to the belt conveyor is provided for the system carrier. According to the invention, the holding device includes at least one attachment part for stationary attachment relative to a belt scaffold of the conveyor belt, a holding element for attaching the system carrier to the attachment part and a supporting element on the attachment part. In an operational arrangement, i.e., an arrangement in which the scraper system fulfils its function during the operation of the conveyor belt, the holding device having the attachment part, holding element and supporting element is preferably provided in the region of an end of the system carrier, more preferably laterally outside the width of the conveyor belt. A counter support, which can preferably have a simpler construction as explained in greater detail below, can be provided on the opposite side.

The attachment part can be part of the belt scaffold or can preferably be fixedly connected to the latter. In a preferred embodiment, the attachment part can be plate-shaped or can have at least one plate-shaped section for attachment of the holding element.

According to the invention, the holding element is coupled to the system carrier via a tensioning arrangement, by means of which the system carrier can be acted upon with a torque about its longitudinal axis. Due to the torque, the scraper elements can preferably be pressed onto the conveyor belt. The tensioning arrangement preferably acts between the holding element and the system carrier, e.g., via an element attached in a rotationally fixed manner to the system carrier, e.g., a tensioning arm. The tensioning arrangement can have, e.g., a tensioning element such as a pawl and ratchet, a tensioning screw and/or a spring element which has the effect of applying the torque between the holding element and the system carrier.

According to the invention, the holding element can be detachably connected to the attachment part. In the operative position, the holding element is connected to the attachment part and the system carrier is held on the attachment part via the holding element. By detaching the holding element from the attachment part, the scraper system can be transferred from the operative position into a assembly arrangement, in which the system carrier having the scraper module and the holding element can be extracted in its longitudinal direction into an extracted position. When the system carrier is extracted in its longitudinal direction, the scraper module can pass the attachment part (as well as preferably the supporting element). For this purpose, a free region of sufficient size and a suitable shape is preferably provided, such that when the system carrier moves solely in the longitudinal direction, i.e., preferably without a movement in the transverse direction, the scraper module or the scraper modules as well as the holding element can also pass the attachment part and preferably the supporting element. The free region can be formed at least in part by a cutout on the supporting element. During or prior to the extraction, starting from the operative position, in which the scraper element abuts against with the conveyor belt, the system carrier together with the scraper module attached thereon can possibly be rotated to a certain extent, so that projecting parts can pass the free region.

According to the invention, it is provided that, in the extracted position (and preferably continuously during the process of extracting the system carrier), the supporting element supports the system carrier. The supporting element can preferably be provided on the attachment part in a fixed or detachable manner; it is also possible that the supporting element is configured integrally with the attachment part. The supporting element can particularly preferably be hook-shaped and at least partially encompass the system carrier. Whilst the supporting element preferably does not have any contact with the system carrier in the operative position, it can take over the supporting of the system carrier immediately after detaching the connection between the holding element and the attachment part. Thus, the weight of the system carrier and of the scraper modules does not have to be supported in another way by manual holding or supporting on a scaffold to be specially attached or similar.

Extracting the system carrier in the longitudinal direction thereof is preferably to be understood to be a linear, translatory movement. During the transfer into the extracted position, the scraper module passes the attachment part, i.e., it is located in the operative position on a first, inner side of the attachment part and in the extracted position on the opposite, outer side thereof.

The scraper system according to the invention thus makes it possible to extract the system carrier laterally into the extracted position, in which the scraper module is located outside the attachment part and is easily accessible for mounting, inspection or maintenance purposes. The supporting element causes the system carrier to be supported such that the latter does not have to be held by the operator and the risk of it falling down is reduced or eliminated. The supporting action of the supporting element is understood to be an effect of force directed vertically upwards, i.e., the system carrier can preferably rest on the supporting element.

It is preferred that the supporting element does not support the system carrier until after the holding element has been detached from the attachment part, i.e., in the operative position no direct contact exists between the supporting element and the system carrier, but a small distance remains of, e.g., at least 0.5 mm or 1 mm, preferably less than 5 cm, particularly preferably less than 1 cm. After detaching the holding element from the attachment part, the side of the system carrier connected to the holding element can preferably be lowered by this small amount until it comes into contact with the supporting element. The arrangement is preferably such that as long as the system carrier remains in an opposite counter-support device, only a small tilting of the system carrier of, e.g., less than 5°, particularly preferably less than 1° is produced.

Thus, it is possible to carry out simple maintenance on and, in particular, to simply exchange scraper modules or scraper elements on the scraper system according to the invention, without necessarily having to enter the region beneath the conveyor belt. By supporting the system carrier during extraction or in the extracted position, the handling is particularly simplified and the operation can preferably be performed by a single person.

For the attachment of the holding element to the attachment part, various types of connection can be used, wherein a detachability which is as simple as possible is preferred, but sufficient stability is required in operation. For example, a screw connection with one or more screws can be provided.

According to a further development of the invention, the holding element is connected to the attachment part by means of a screw connection in combination with at least one plug connection, preferably two plug connections which are arranged at a distance from one another. The plug connection or the plug connections are preferably designed such that that they are aligned in the direction of the longitudinal axis of the system carrier, such that the holding element can be removed from the attachment part following the releasing of the screw connection in the longitudinal direction of the system carrier. A bolt is preferably used as the plug connection, which bolt is received in a receiving opening. The bolt is particularly preferably arranged on the attachment part and the receiving opening is arranged on the holding element, although the reverse arrangement is also possible. The screw connection as well as the plug connection(s) are preferably aligned parallel to one another. Only one screw is particularly preferably provided, which is arranged between two plug connections. Thus, a sufficiently fixed connection can be utilized for the operation, which can be very quickly and simply detached.

According to a further development, it is provided that the supporting element partially encompasses the system carrier. To this end, the inner shape of the supporting element, which faces the system carrier, can correspond at least in certain sections to the contour of the system carrier. For example, with a round contour of the system carrier, the inner shape of the supporting element can be partially circular. The supporting element can preferably have a recess, in which the system carrier is in part received and thus supported and secured against movements in the transverse direction, in particular against dropping out. The supporting element more preferably encompasses the system carrier over a first part of the circumference thereof, while it leaves free a second part of the circumference of the system carrier such that, when the system carrier is extracted, the scraper module can pass the supporting element. The first circumferential part over which the system carrier is encompassed by the supporting element can, e.g., be at least 90° and up to 180°, with encompassing over a circumferential region >115° and <155° being preferred. Thus, good support is ensured, such that a risk of the system carrier dropping out is minimized. On the other hand, too wide and in particular complete encompassing is not preferred, such that the system carrier having the scraper module can still be extracted. The shape of the supporting element is preferably adapted at least over the first circumferential part of the outer contour of the system carrier; the system carrier particularly preferably has a round cross-section at least in certain sections and the supporting element is partially annular.

In a preferred embodiment, the attachment part is arranged vertically above the system carrier and the supporting element extends vertically downwards in the direction of the system carrier, such that it at least partially encompasses the latter. At least one section of the supporting element preferably encompasses the system carrier to such an extent that the latter is arranged between the attachment part and the encompassing section of the supporting element, i.e., the encompassing section of the supporting element extends preferably to below the system carrier.

A rotary bearing is preferably provided between the holding element and the system carrier, which allows at least a slight rotation relative to one another in order to thus preferably modify the arrangement and in particular the bias between the scraper element and the conveyor belt. The rotary bearing can be formed in various ways, preferably as a bearing bushing, particularly preferably as a plastic bushing.

In a preferred embodiment, the holding element is designed at least in partially plate-shaped and the system carrier penetrates the holding element, preferably perpendicularly thereto. Such an arrangement is particularly simple in construction and enables a stable fastening, in particular if the attachment part and/or the supporting element also are plate-shaped and are arranged on one another.

As already mentioned, a counter support to the holding device is preferably provided such that the system carrier is mounted in the holding device and the counter support. Like the (first) attachment part of the holding device, a second attachment part is preferably provided for the counter support, which is arranged at a distance from the first attachment part in the longitudinal direction of the system carrier. The system carrier is preferably rotatably mounted on the second attachment part and displaceably mounted in its longitudinal direction. To this end, a bearing sleeve for the system carrier can also be preferably provided on the second attachment part or on an element connected therewith, particularly preferably as a bearing bush, e.g., made of plastic. The counter-bearing is preferably not locked in the longitudinal direction of the system carrier such that the system carrier can be extracted from the counter support, after detaching the support device, without further measures. Thus, a disassembly with access only from the side of the holding device is possible, without access to the counter support being required.

According to a preferred embodiment, an extraction aid can be provided for the system carrier, which can be attached to the system carrier such that it extends in the extension thereof in the longitudinal direction of the system carrier. Such an extraction aid can help to grab and to guide or hold the system carrier during extracting. The extraction aid and/or system carrier preferably has/have an insertion opening at the end such that the extraction aid and the system carrier can be inserted into one another. An interposed piece, i.e., an adapter, for coupling the extraction aid and the system carrier can also be used. Such an adapter can have, e.g., a clamping device for clamping with the system carrier and an engagement section for coupling to the extraction aid. More preferably, a locking device for fixing the extraction aid to the system carrier and/or to the adapter can be provided such that an unintentional removal can be avoided.

As already explained, various types of scraper modules can be attached to the system carrier. According to a preferred embodiment, the scraper module (or preferably all of the scraper modules) has/have a module arm to which the scraper element is attached. The module arm can be pivoted in a module joint, preferably about an axis which is aligned at least substantially parallel to the longitudinal direction of the system carrier. This is to be understood to mean that the alignment can also include a slight oblique position or slight rotation, preferably at angles <30°, more preferably <20°, particularly preferably <10°.

The scraper module preferably has a spring element in order to act on the module arm with a torque. Different types of spring elements are possible, with a rubber torsion spring being preferred. The spring element can cause the scraper element to press against the conveyor belt. More preferably, the scraper module can have a stop for the rotation of the module arm in the module joint in order to restrict the pivot movement of the scraper element in the direction of the conveyor belt. If a spring element is used, the stop is preferably arranged such that the spring acts on the module arm in the direction of the stop, wherein there is still a bias at the stop.

A belt conveyor can be equipped with the scraper system according to the invention such that the scraper element abuts against the conveyor belt and the attachment part is fastened to the belt scaffold.

Work, e.g., mounting, testing or maintenance work, can be carried out on the scraper system according to the invention in a particularly simple manner in that, starting from the operative position, the holding element is detached from the attachment part, the system carrier having the scraper module and the holding element is extracted in the longitudinal direction of the system carrier, wherein, during the extraction of the system carrier, the supporting element supports the latter.

BRIEF DESCRIPTION OF THE DRAWINGS

Embodiments of the invention are described in greater detail below, with reference to drawings, wherein:

FIGS. 8*a*-8*e* show perspective views of various positions of parts of the scraper according to the first embodiment during the extraction of the system carrier.

FIG. 11 shows a perspective view of a part of a belt conveyor having a conveyor belt and a scraper according to a second embodiment;

FIG. 12 shows a top view of a system carrier of the scraper from FIG. 11;

FIG. 13 shows a side view of the scraper from FIGS. 11, 12;

FIG. 14 shows a view similar to FIG. for the scraper from FIGS. 11-13 according to the second embodiment.

DETAILED DESCRIPTION OF EMBODIMENTS

Figure 1:
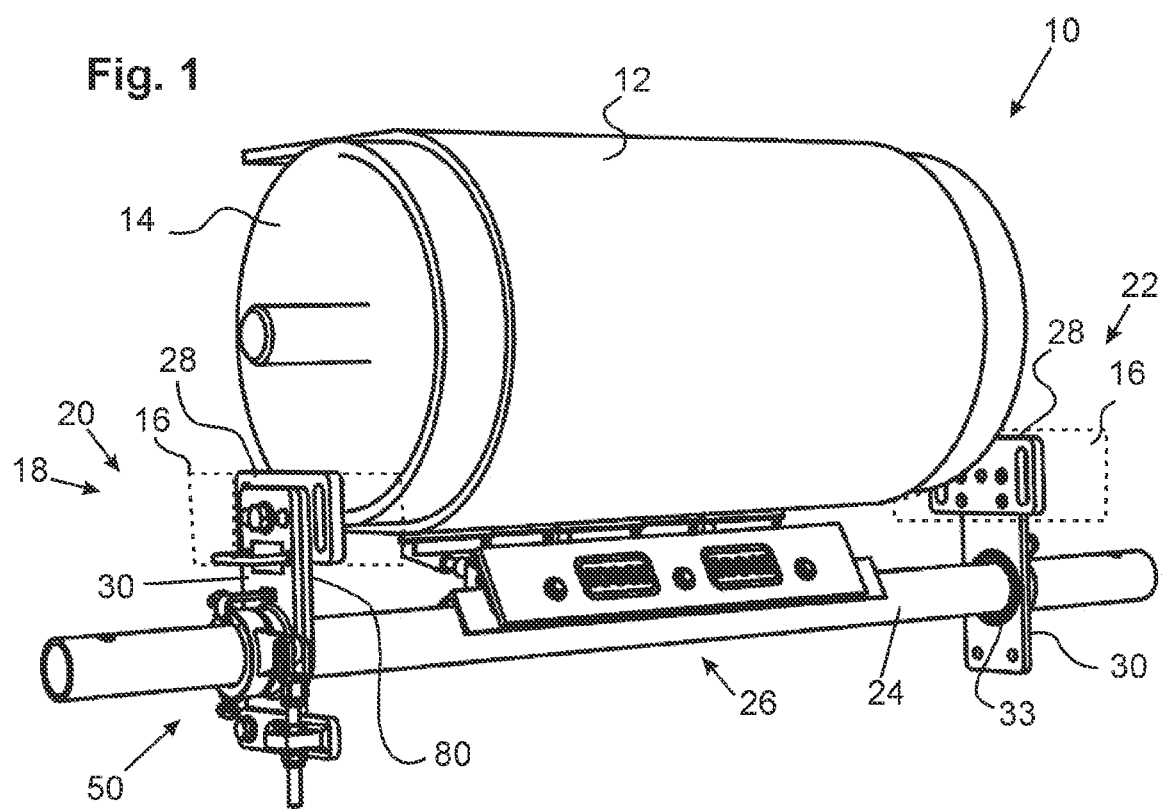
FIGS. 1, 2 show perspective views of a part of a belt conveyor having a conveyor belt and a scraper according to a first embodiment.
Figure 2:
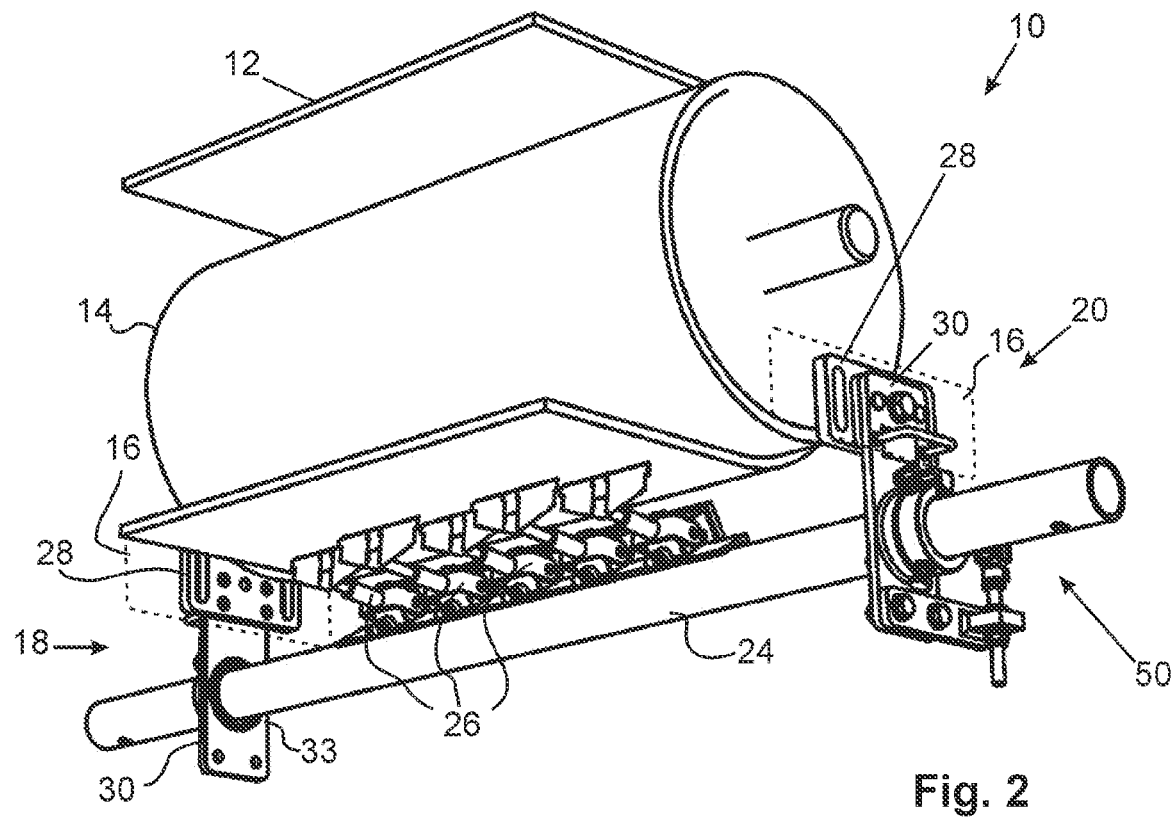

FIGS. 1 and 2 show perspective views, for a first embodiment, of a part of a belt conveyor 10 having a conveyor belt 12 which is deflected around a deflection drum 14. A shaft of the deflection drum is mounted on a belt scaffold 16, only parts of which are depicted schematically here.

On the belt conveyor 10, a scraper 18 having a plurality of scraper modules 26 is provided with a system carrier 24 and a holding device 20 and counter support 22 for attachment to the belt scaffold 16.

The holding device and the counter support 22 each have an attachment part which is fastened to the belt scaffold 16 or is part of the belt scaffold 16, here in each case in the form of attachment plates 28. A holding element in the form of a holding plate is in each case attached to the attachment plates 28.

In the embodiment shown, the system carrier 24 is a tube of a constantly round cross-section. The holding plates 30 each have round recesses with plastic sliding bushes 33 inserted therein, in which the system carrier 24 is rotatably mounted.

Figure 3:
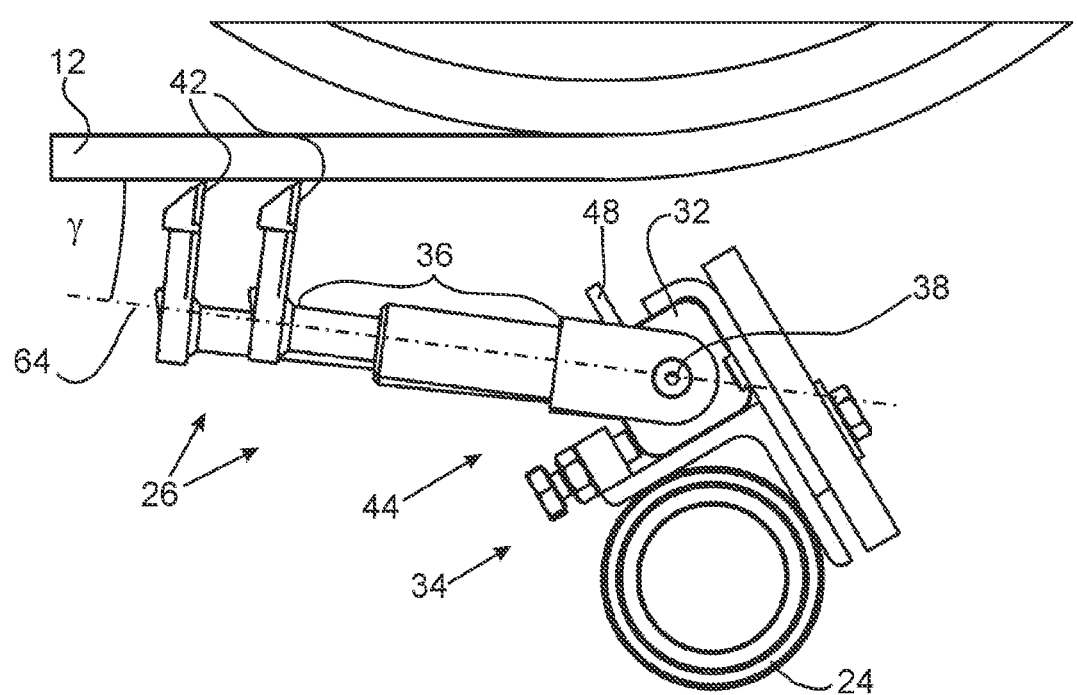
FIG. 3 shows a side view of the scraper from FIGS. 1, 2.

In FIG. 3, two scraper modules 26 are depicted in a side view. The scraper modules 26 each include a base element 32 which is detachably attached to the system carrier 24 in a clamping holding device 34. A scraper arm 36 is pivotably attached to the base element 32 about a pivot axis 38. A scraping element holder 40 having a scraping element 42 is in each case arranged at the end of the scraper arm 36.

As can be seen, e.g., from FIG. 2, multiple scraper modules 26 are arranged next to one another on the system carrier 24. The system carrier 24 extends in the direction of the width of the conveyor belt 12, that is to say transversely to the running direction thereof. In the case of the first embodiment, scraper modules 26 arranged next to one another each have in alternation shorter and longer scraper arms 36 such that the scraper elements 42 are arranged in two staggered rows, wherein viewed in the running direction of the conveyor belt, a slight overlapping between the scraper elements 42 of the two rows is provided constantly. The scraper modules 26 are positioned next to one another such that the rows extend at least substantially over the entire width of the conveyor belt 12.

During the operation of the belt conveyor 10 and of the scraper 18, scraping edges of the scraper elements 42 lie in contact with the surface of the conveyor belt 12 in a peeling manner, as shown in FIG. 3, in the example shown in the return region of the conveyor belt 12. The scraper elements 42 are pressed in an elastic manner against the surface of the conveyor belt 12. Contaminants and adherent conveyed goods are thus scraped off from the running conveyor belt 12 by the scraper elements 42.

Figure 4:
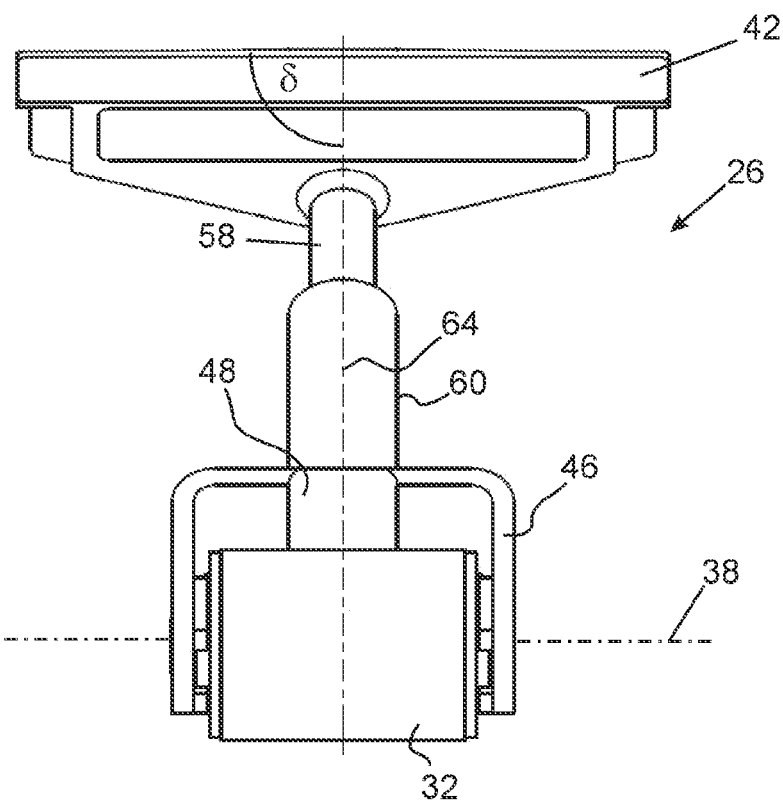
FIGS. 4, 5 show a scraper module of the scraper from FIGS. 1-3 in a top view as well as in a partially cut-away side view.
Figure 5:
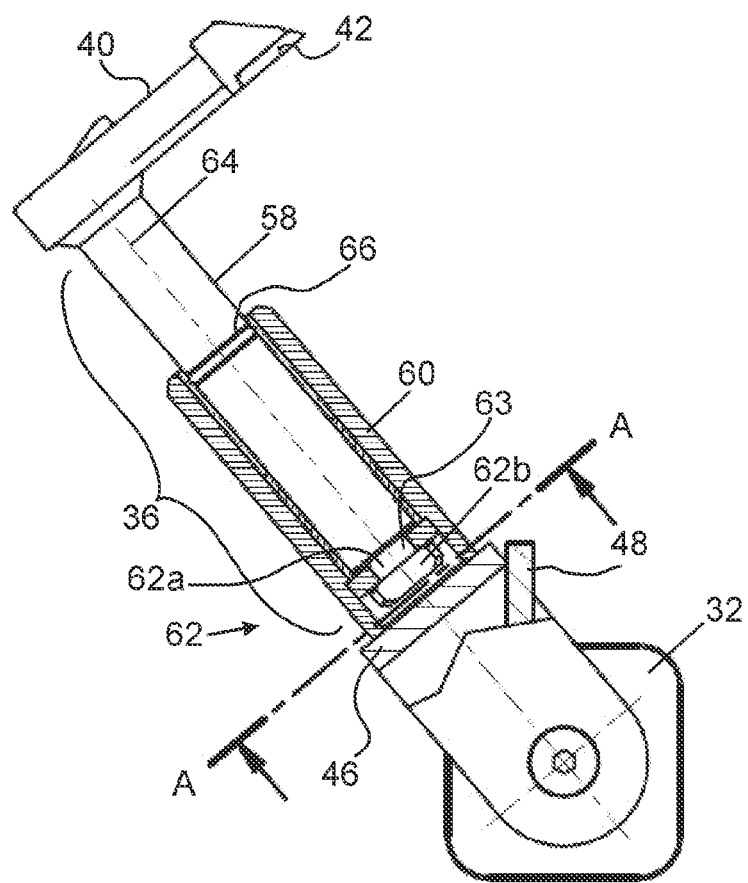

In FIGS. 4, 5, one of the scraper modules 26 is depicted in greater detail. As shown there, a joint 44 is provided between the base element 32 and the scraper arm 36 such that the scraper arm 36 can be pivoted about a pivot axis 38. As depicted, the joint 44 includes a stirrup 46 encompassing the base element 32.

A rubber torsion spring (not depicted), which exerts a torque on the scraper arm 36, acts in the interior of the joint 44.

A protruding tab is provided as a stop 48 on the base element 32. In a stop position, a part of the stirrup 46 abuts against with the stop 48 such that the scraper arm 36 cannot pivot further about the pivot axis 38. The rubber torsion spring is configured such that it acts upon the scraper arm 36 in the direction of the stop, wherein a bias 48 of the spring prevails in the stop position depicted in FIG. 5.

Due to the effect of the respective springs of the scraper modules 26, the scraper elements 42 are pressed against the surface of the conveyor belt 12, but can take evasive action by pivoting in the joints 44 during the influence of corresponding forces during operation, e.g., due to stationary belt damage, elevations or similar on the surface of the conveyor belt 12 by a corresponding pivot movement of the scraper arm 36 about the pivot axis 38 against the effect of the spring.

A bias of the entire scraper 18, with which the entirety of the scraper elements 42 is pressed against the conveyor belt 12, is predefined by specifying a rotational position of the system carrier 24. A tensioning device 50 is provided on the holding device therefor between the holding plate and the system carrier 24.

Figure 1A:
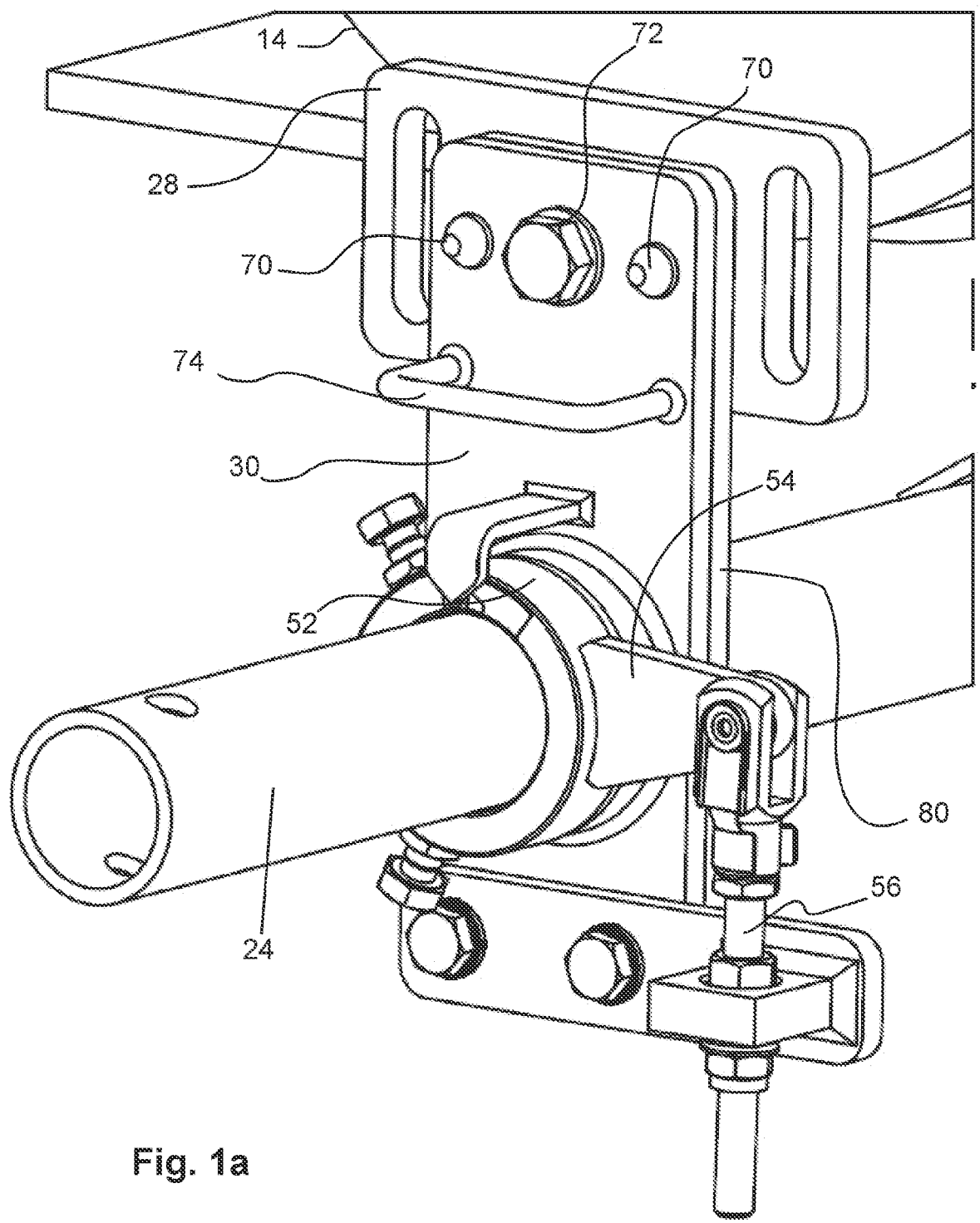
FIG. 1*a* shows an enlarged perspective view of a holding device from FIG. 1.

FIG. 1*a* shows the holding device in an enlarged representation. A clamping ring attached to the system carrier 24 has a tensioning arm 54 protruding radially from the system carrier 24, which can be tensioned by means of a tensioning screw 56 with respect to an attachment fixedly attached to the holding plate 30. By adjusting the tensioning screw 56, the system carrier 24 can thus be rotated and a bias of the springs of the scraper modules 26 can be set.

As is further shown in FIGS. 1, 1*a*, a plate-shaped supporting element 80, which is arranged in the embodiment shown between the attachment plate 28 and the holding plate 30, is in addition attached to the attachment plate 28 of the holding device 20. The shape and function of the supporting element 80 are explained in greater detail below, with respect to FIGS. 8*a*-8*d* and FIG. 10.

During the operation of the scraper 18, constant wear to the scraper elements 42 results such that regular inspection and maintenance are required. The scraper 18 is designed in terms of its attachment to the belt scaffold 16 as well as in terms of the attachment of the scraper elements 42 to the scraper modules 26 to be maintained in a particularly simple manner.

Figure 7:
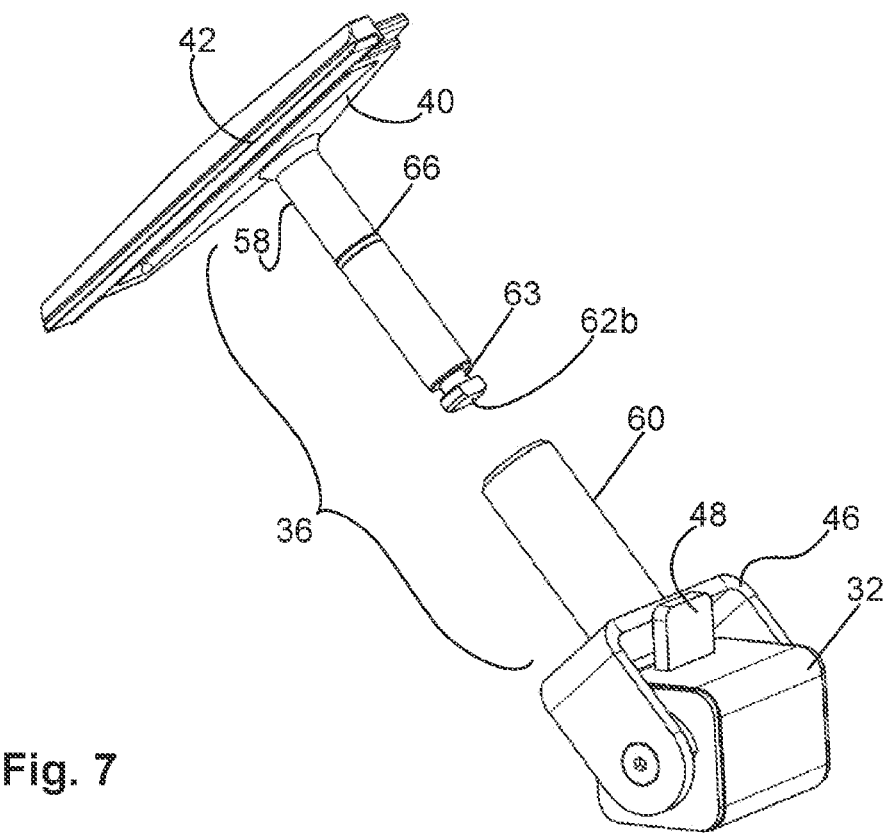
FIG. 7 shows a perspective view of the scraper module from FIGS. 4, 5 having a detached scraper element.

As is evident in particular from FIGS. 4, and 7, the scraper arm 36 includes two elements which are detachably fastened to one another, namely a shaft 58 attached to the scraper element holder 40 and a sleeve 60 connected to the base element 32, namely fastened to the stirrup 46 of the joint 44. The shaft 58 is inserted into the sleeve 60 (FIG. 5) and is secured by means of a twist lock 62 in the direction of a longitudinal axis 64 of the scraper arm 36.

The longitudinal axis 64 extends in the embodiment shown, as is obvious from FIGS. 2 and 3, in a vertical view parallel to the running direction of the conveyor belt 12 and thus also perpendicular, i.e., at an angle β of 90° (see FIG. 8e), to the longitudinal axis of the system carrier 24. In a horizontal view from the side (FIG. 3), the longitudinal axis 64 extends at an angle γ of approx. 9° to the running direction of the conveyor belt 12. The longitudinal axis 64 in the embodiment shown is further aligned perpendicular, i.e., at an angle δ of 90°, to the contact edge of the scraping element 42 (see FIG. 4).

The shaft 58 can be freely rotated inside the sleeve 60 about the longitudinal axis 64, which is why the longitudinal axis 64 is also referred to as the rotational axis. However, a sealing ring 66 is provided which, on the one hand, causes a sealing of the inner space of the sleeve 60 with respect to the shaft 58 and, on the other hand, due to friction because of the contact with the inner side of the sleeve 60 produces a certain sluggishness of the movement of the shaft 58 with respect to the sleeve 60.

The twist lock 62 includes on the side of the sleeve 60 an elongated window 62a arranged in the interior, which has a rim which protrudes into the interior of the sleeve 60, and includes on the side of the shaft 58 an elongated plate-shaped engagement element 62b which is fixedly attached at the end of the shaft 58 to an extension 63 having a smaller diameter.

Figure 6:
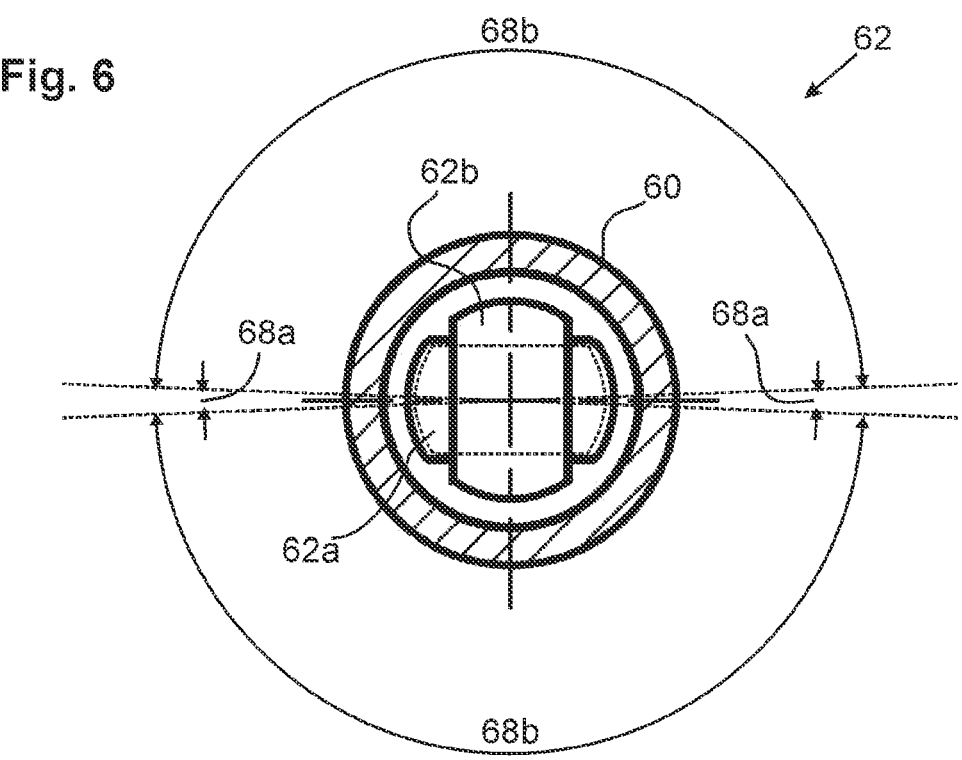
FIG. 6 shows a cross-section through the scraper module from FIG. 5 along the line A . . . A.

As is obvious in particular from the cross-sectional view in FIG. 6, the engagement element 62b and the window 62a are formed such that the engagement element 62b, when aligned parallel to the window 62a (dashed representation), can be inserted through the latter in the direction of the longitudinal axis 64, while it is locked in a twisted position with respect to the parallel alignment at the rim of the window 62a as shown (solid line).

Therefore, in terms of the fixing of the shaft 58 to the sleeve 60 in the axial direction of the longitudinal axis 64 there results a dependence on the rotational position:

In a position of the engagement element 62b parallel to the window 62a (dashed representation), the shaft 58 having the scraper element holder 40 attached thereto and the scraper element 42 is located in a position within a release angular range 68a. In a rotational position in the release angular range, the twist lock 62 is released and the shaft 58 can be freely displaced in the longitudinal direction with respect to the sleeve 60.

When the shaft 58 is further twisted with respect to the sleeve 60, the ends of the engagement element 62b engage behind the rim of the window 62a such that the shaft 58 is fixed in the longitudinal direction with respect to the sleeve 60. The corresponding rotational positions of the shaft 58 are within a fixed angular range 68b, in which the twist lock 62 is locked.

As depicted, the release angular range 68a is centered around the rotational position shown dashed in FIG. 6, in which the front edge of the scraper element 42 provided for abutting against the conveyor belt 12 is located at 90° to the longitudinal direction of the system carrier 24 and to the pivot axis 38 of the scraper module 26. By contrast, the fixed angular range 68b is centered around a rotational position which is rotated by 90° against this and shown in FIG. 6 with a solid line. In this rotational position, the scraping edge of the scraper element 42 is aligned parallel to the longitudinal direction of the system carrier 24 and to the pivot axis 38 of the joint 44.

Due to the free rotatability of the shaft 58 inside the sleeve 60, the respective scraper element 42 can, during contact with the conveyor belt 12, align itself according to the contour thereof. In practice, this will not be constantly planar over the entire belt width but will curve, e.g., towards the edges. Due to the contact pressure, the scraper element holders 40 always adjust themselves such that the scraper elements 42 follow the shape of the conveyor belt 12.

However, a rotational position which lies within the release angular range 68a is not achieved in any operative position. The twist lock 62 thus constantly remains in the fixed angular range during the contact of the scraper element 42 with the conveyor belt 12 and thus ensures the fastening to the base element 32 of the respective scraper modules 26.

In order to enable work on the scraper 18 and the scraper modules 26, in particular to make it possible to exchange the unit comprising the scraper element 42, scraper element holder 40 and shaft 26, the system carrier 42 with the scraper modules 26 attached thereto can be detached in a particularly simple way and extracted laterally, as explained below with regard to FIGS. 8a to 8e.

Therefor, on the side of the holding device 20, a particular attachment of the holding plate to the attachment plate 28 is provided and, on the side of the counter support 22, a bearing of the system carrier 24 in the bearing bush 33 of the holding plate 30 is provided such that the system carrier 24 is freely movable in its longitudinal direction.

As depicted in FIG. 1a, the holding plate 30 is fixed to the attachment plate 28 of the holding device by two plug connections 70 and a screw connection 72. The plug connections 70 are formed by two bolts arranged in parallel at a distance from one another on the attachment plate 28, which are received precisely fit in bores of the holding plate 30. The plug connections 70 can be detached by removing the holding plate 30 from the attachment plate 28 in the longitudinal direction of the system carrier 24.

The screw connection 72 formed between the plug connections 70 includes a screw aligned parallel to the bolts, with which screw the holding plate 30 is screwed to the attachment plate 28.

In an operative position for operating the belt conveyor 10 and the scraper 18, the holding plate 30 is fixed to the attachment plate 28 by means of the screw connection 72.

If operation is interrupted, parts of the scraper 18 to be maintained can be extracted by transferring the scraper 18 into a assembly arrangement. By loosening the screw connection 72, the holding plate 30 can be detached from the attachment plate 28 by subsequently also detaching the plug connections 70a, 70b by pulling in the direction of the longitudinal axis of the system carrier 24. A handle 74 is provided for this.

Figure 8A:
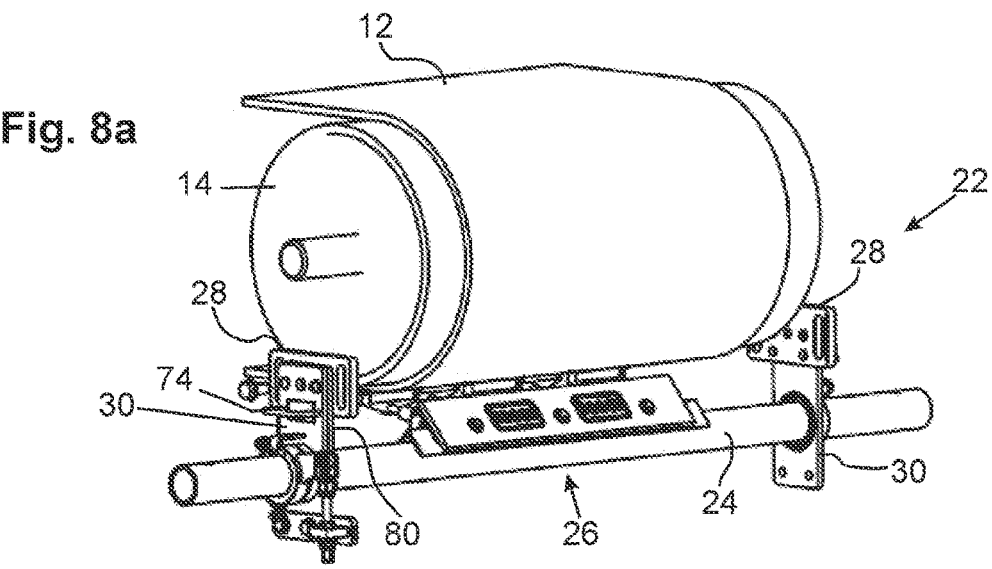

FIG. 8a shows, starting from the operative position, first of all the releasing of the screw connection 72. The holding plate 30 is subsequently pulled off from the attachment plate 28, together with the system carrier 24 in the longitudinal direction thereof, wherein the plug connections 70a, 70b are detached.

As already mentioned, the holding device 20 between the attachment plate 28 and the holding plate 30 includes the supporting element 80. The supporting element 80 has, as is obvious from FIG. 8b, a hook-shaped holding section 82 extending in the direction of the system carrier 24 and partially encompassing the latter, which configures a recess 86. The holding section 82 and the recess 86 have, as shown, an (in this case round) inner contour in certain sections corresponding to the (in this case round) outer contour of the system carrier 24. The holding section 82 is arranged in the operative position, i.e., if the holding plate 30 is fastened to the attachment plate 28 such that it does not touch the system carrier 24, but remains at a certain distance of a few millimeters herefrom. Above the holding section 82, the supporting element 80 has a cutout 84 through which the system carrier 24 passes.

Figure 10:
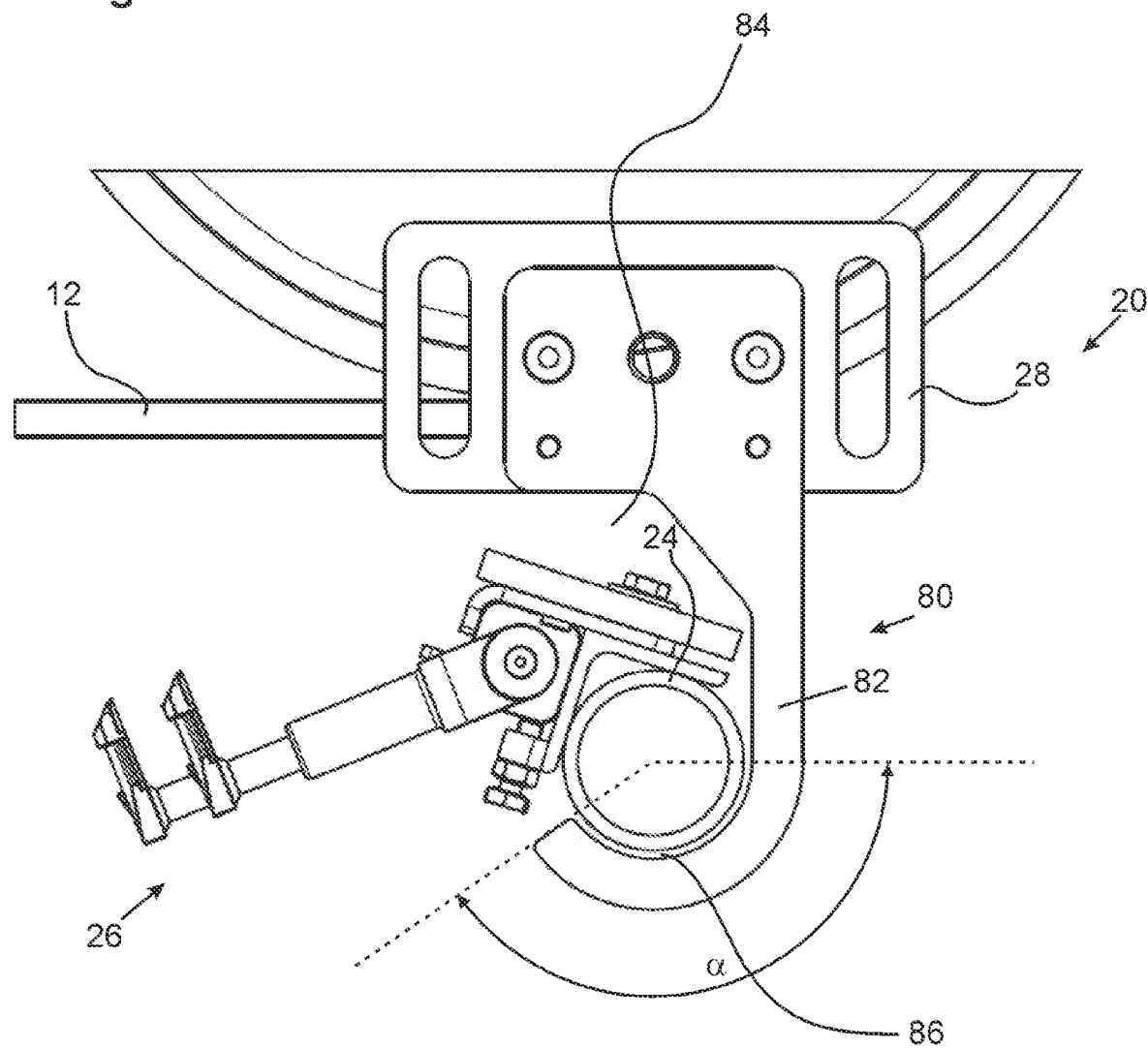
FIG. 10 shows a cross-sectional view along line B . . . B from FIG. 8*b;*

In the assembly arrangement, i.e., following the releasing of the screw connection 72 and of the plug connections 70a, 70b (FIG. 8b), the system carrier 24 sinks slightly and thereafter rests on the holding section 82 of the supporting element 80 in the recess 86. After detaching the connection between the holding plate and the attachment plate 28, the supporting element 80 thus takes over the holding of the system carrier 24. As depicted, the supporting element 80 is fastened to the holding plate 28 and thus to the belt scaffold 16. As depicted in FIG. 10, the holding section 82 encompasses the system carrier 24 over a circumferential region a of approx. 135° at the recess 86 and supports the system carrier 24 from below such that the latter does not drop.

Figure 8B:
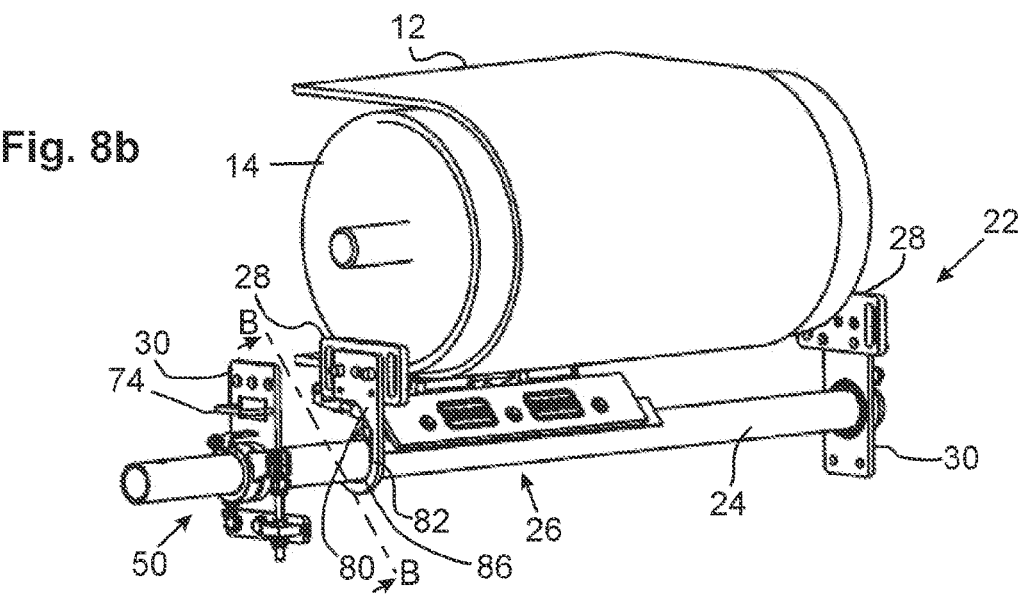
Figure 8C:
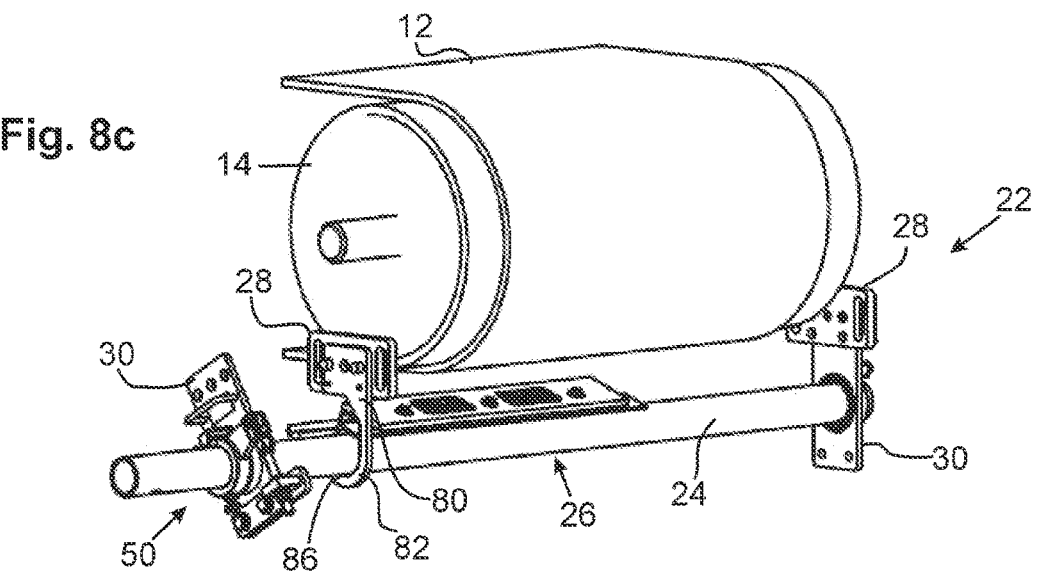

In the further course, the system carrier 24 is now pulled out in the direction of its longitudinal axis together with the holding plate 30 and the tensioning device 50 (FIG. 8b). In the process, the supporting element 82 supports the system carrier 24 such that the latter does not fall down. Due to the displaceability of the system carrier 24 in the bearing bush 33 of the counter support 22, it is possible to pull it out particularly easily.

The scraper modules 26 can pass the attachment plate 28 and the supporting element 80, because the hook-shaped form of the holding section 82 which only partially encompasses the system carrier 24 with the cutout 84 leaves sufficient space free such that when the system carrier 24 is pulled out, the scraper modules 26 can be transferred into an extracted position outside of the belt region (FIG. 8d). The scraper modules 26 can thus be guided through a free area in the plane of the supporting element 80 as well as the attachment plate 28, without striking. The cutout 84 of the supporting element 80 forms part of the free area.

In the extracted position, the scraper modules 26 are easily accessible and can be inspected as well as maintained. In particular, worn scraper elements 42 can be replaced by detaching the respective units made up of the scraper element 42, scraper element holder 40 and shaft 58 of the respective scraper module as described above by twisting them about the rotational axis 64, by separating them by removing them in the longitudinal direction and by subsequently attaching new elements in the same way.

Therefore, the process of inspecting and maintaining the scraper 18 is made particularly easy. In the embodiment shown, it is possible to pull out the system carrier 24 together with the scraper modules 26 laterally by simply loosening a single screw (screw connection 72). Due to the support provided by means of the supporting element 80, this can be carried out by a single person.

Figure 9A:
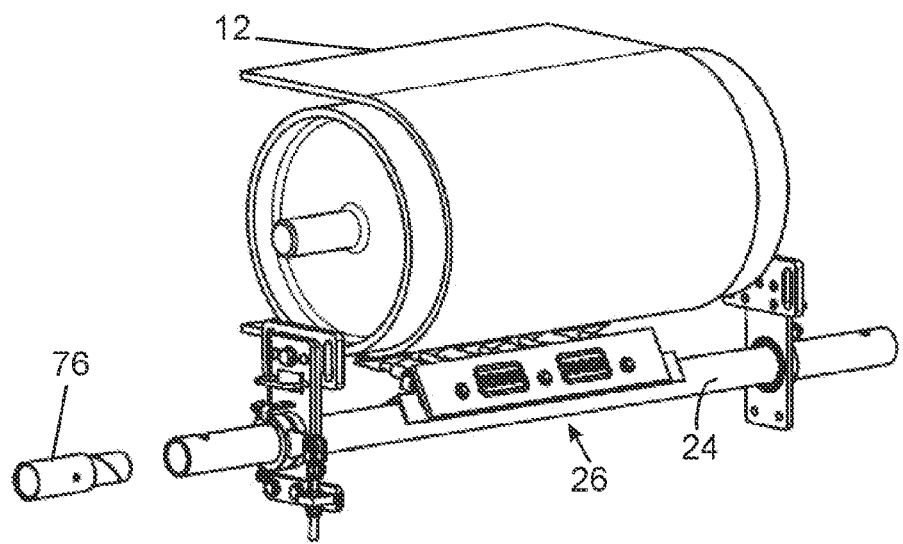
FIGS. 9*a*-9*c* show perspective views of the scraper according to the first embodiment when using an extraction aid.
Figure 9B:
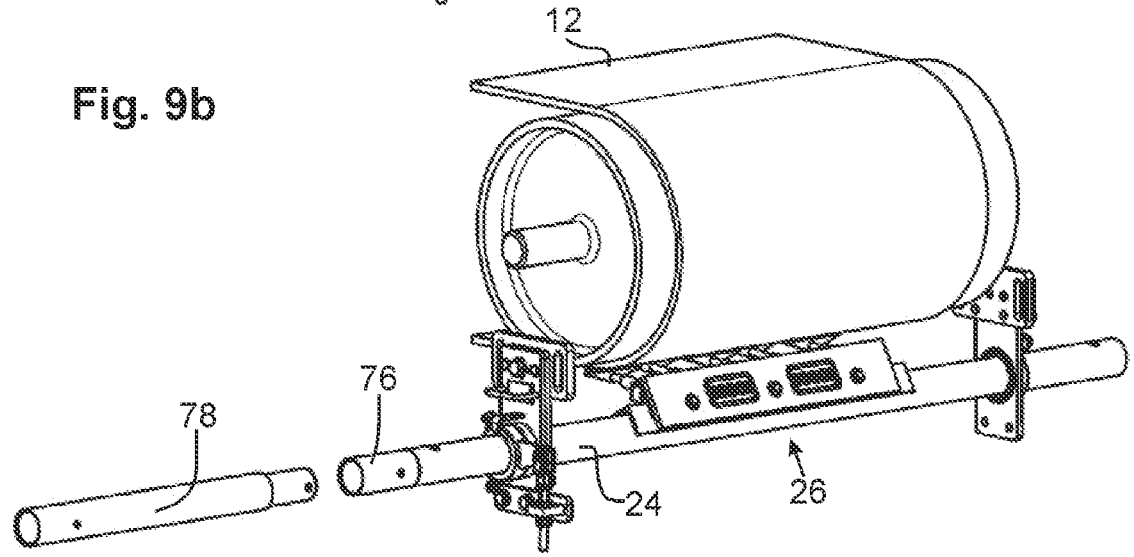
Figure 9C:
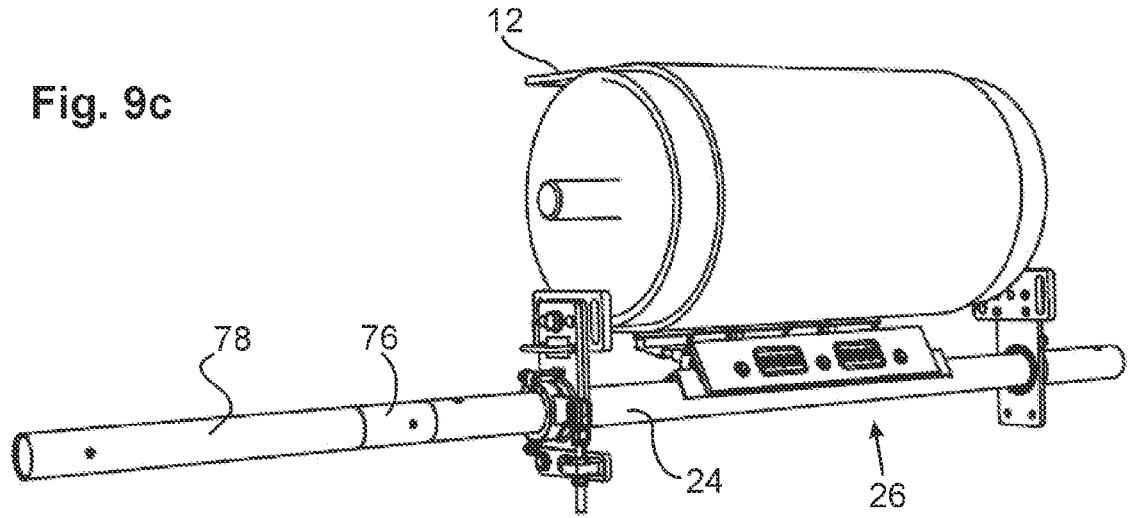

If there is sufficient space available to the side of the conveyor belt 12, the handling of the system carrier 24 can be made even easier when it is pulled out by using an extraction aid. To this end, as shown in FIG. 9a, an adapter 76 can first be fitted laterally onto the system carrier 24 and clamped on or otherwise fixed thereto. A tube can subsequently be attached to the adapter 76, which tube serves as an extraction aid 78 and is attached in extension of the system carrier 24. By means of the extraction aid 78, the system carrier 24 can be handled particularly well, in particular in connection with the support on the holding section 82 of the supporting element 80.

A scraper 118 according to a second embodiment is shown in FIGS. 11-14. The scraper 118 according to the second embodiment corresponds, in numerous details, to the scraper 18 according to the first embodiment such that only the differences are explained in greater detail below and reference is made in other respects to the aforementioned description. The same reference numerals denote elements that corresponds between the embodiments.

Whereas, in the case of the scraper 18 according to the first embodiment as described and depicted the scraping elements 42 are arranged in two rows, the scraper 118 according to the second embodiment includes a single-row arrangement of scraping elements 42 on scraper modules 126 which are each of identical length and which are arranged next to one another on the system carrier 24.

As is particularly obvious from FIG. 12, the scraping edges of the scraper elements 42 are not aligned in the transverse direction of the conveyor belt 12, as in the case of the first embodiment, but obliquely thereto at an angle which, in the depicted example, is approx. 15°. However, the scraper arms 36 extend with their longitudinal axis 64, as in the case of the first embodiment, in the longitudinal direction of the conveyor belt 12, i.e., as in the case of the first embodiment, at an angle of β of 90°.

The scraper elements 42 are attached obliquely at an angle δ of approx. 75° to the scraper arms 36. Adjacent scraper modules 126 on the system carrier 24 are arranged so closely that—viewed in the longitudinal direction of the conveyor belt 12—a slight overlapping of the scraper elements 42 arises and thus a scraping effect over the entire belt width.

In other respects, the scraper 118 according to the second embodiment is identical in terms of construction and function to the scraper 18 according to the first embodiment, i.e., in common with the scraper 18, each scraper 118 includes the base element 32 which is detachably attached to the system carrier 24 in the clamping holding device 34 as well as the scraper arm 36 which is attached pivotably about a pivot axis 38 and at each end of which a scraping element holder 40 having a scraping element 42 is arranged. The biased torsion spring imparts a torque such that, during the operation of the scraper 118, the scraping edges of the scraper elements 42 lie in contact with the surface 12 of the conveyor belt 12 in a peeling manner and are resiliently pressed against the surface 12 thereof in order to scrape off contaminants. If there are stationary obstacles on the surface of the conveyor belt 12, the scraping elements 42 can take evasive action due to a pivot movement of the scraper arm 36 about the pivot axis 38 against the effect of the spring.

FIG. 13 shows, for the second embodiment, a horizontal view from the side, from which the angle γ between the running direction of the conveyor belt 12 and the longitudinal axis 64 can be seen. Depending on the arrangement and setting, the angle γ can be, e.g., between 0° and 20°; in the embodiment shown, the angle γ is approx. 15°.

In the case of the second embodiment as well, the scraper arm 36 includes the shaft 58 attached to the scraper element holder 40, which shaft is inserted into the sleeve 60 and can be rotated about the longitudinal axis 64 therein. It is ensured by means of the twist lock 62 that the shaft 58 can only be pulled out of the sleeve 60 or inserted into the latter at the corresponding alignment, i.e., rotation from the normal position defined by the belt contact 60.

The invention claimed is:

1. A scraper system for a conveyor belt, having
   a system carrier,
   at least one scraper module, attached to the system carrier, having a scraper element for abutting against the conveyor belt,
   a holding device for the system carrier having at least one attachment part for stationary attachment relative to a belt scaffold of the conveyor belt, a holding element for attaching the system carrier to the attachment part, wherein a supporting element is provided on the attachment part,
   wherein the holding element is coupled to the system carrier via a tensioning arrangement, the tensioning arrangement including an adjustable tensioning element, wherein the system carrier can be acted upon with a torque about its longitudinal axis by the tensioning arrangement,
   and wherein the holding element is detachably connected to the attachment part, such that
   in an operative position, in which the holding element is connected to the attachment part, the system carrier is held on the attachment part via the holding element,
   and in a assembly arrangement, in which the holding element is detached from the attachment part, the system carrier having the scraper module and the holding element can be extracted in the longitudinal direction of the system carrier in an extracted position such that when the system carrier is extracted, the scraper module passes the attachment part,
   wherein, in the extracted position, the attachment part supports the system carrier via the supporting element.

2. The scraper system according to claim 1, in which the holding element is connected to the attachment part by means of a screw connection as well as at least one plug connection,
   wherein the plug connection is aligned in the direction of the longitudinal axis of the system carrier, such that the holding element can be pulled off from the attachment part following the releasing of the screw connection in the longitudinal direction.

3. The scraper system according to claim 1, in which the supporting element grips the system carrier via a first part of the circumference thereof,
   wherein the supporting element leaves free a second part of the circumference of the system carrier such that, when the system carrier is displaced, the scraper module can pass the supporting element.

4. The scraper system according to claim 1, in which the attachment part is arranged above the system carrier, and the supporting element encompasses the system carrier at least so far that the system carrier is arranged between the attachment part and a section of the supporting element.

5. The scraper system according to claim 1, in which a rotary bearing is provided between the holding element and system carrier.

6. The scraper system according to claim 1, in which the holding element has at least in part a plate-shaped configuration,
   and the system carrier penetrates the holding element.

7. The scraper system according to claim 1, in which the attachment part is a first attachment part,
   and a counter support is provided with a second attachment part which is arranged at a distance from the first attachment part in the longitudinal direction of the system carrier,
   wherein the system carrier is displaceably mounted with respect to the second attachment part in its longitudinal direction.

8. The scraper system according to claim 1 in which an extraction aid can be attached to the system carrier such that it extends in the extension thereof in the longitudinal direction of the system carrier.

9. The scraper system according to claim 1, in which the scraper module has a scraper arm to which the scraper element is attached,
   wherein the scraper arm can be pivoted in a module joint about a pivot axis, which is aligned at least substantially parallel to the longitudinal direction of the system carrier.

10. The scraper system according to claim 9, in which the scraper module has a spring element to act on the scraper arm with a torque.

11. The scraper system according to claim 1, in which the scraper module is attached to the system carrier in a clamping holding device.

12. A belt conveyor, having a scraper system according to claim 1, the belt conveyor further comprising
    a belt scaffold and a conveyor belt circumferentially attached thereto,
    wherein the system carrier is arranged transversely to the conveyor belt,
    the scraper element abuts against the conveyor belt,
    and wherein the attachment part is fastened to the belt scaffold or is part of the belt scaffold.

13. A method for performing mounting, testing or maintenance work on the scraper system according to claim 1, in which,
    starting from the operative position, the holding element is detached from the attachment part,
    and the system carrier having the scraper module and the holding element is extracted in the longitudinal direction of the system carrier,
    wherein, during the extraction of the system carrier, the supporting element supports the latter.

14. The method according to claim 13, in which,
    in the operative position, the holding element is connected to the attachment part by means of a screw connection as well as at least one plug connection, wherein the plug connection is aligned in the direction of the longitudinal axis of the system carrier,
    and the holding element is detached from the attachment part by releasing the screw connection,
    and the plug connection is detached by removing the attachment part in the longitudinal direction.

* * * * *